United States Patent [19]

Nienhaus

[11] Patent Number: 5,308,281
[45] Date of Patent: May 3, 1994

[54] COUPLING DISCONNECTED IN THE CASE OF OVERLOADING

[75] Inventor: Clemens Nienhaus, Lohmar, Fed. Rep. of Germany

[73] Assignee: Jean Walterscheid GmbH, Lohmar, Fed. Rep. of Germany

[21] Appl. No.: 905,805

[22] Filed: Jun. 29, 1992

[30] Foreign Application Priority Data

Jun. 19, 1991 [DE] Fed. Rep. of Germany ....... 4121631

[51] Int. Cl.[5] .................. F16D 11/06; F16D 11/00
[52] U.S. Cl. .............................. 464/30; 192/71
[58] Field of Search ............... 192/56 L, 56 R, 71; 464/30, 41, 37–39, 42–44

[56] References Cited

U.S. PATENT DOCUMENTS

| 4,261,453 | 4/1981 | Kunze | 192/71 X |
| 4,437,553 | 3/1984 | Geisthoff | 464/37 X |
| 4,960,010 | 10/1990 | Müller et al. | 192/71 X |

FOREIGN PATENT DOCUMENTS 3001566 7/1981 Fed. Rep. of Germany .

Primary Examiner—Daniel P. Stodola
Assistant Examiner—John Q. Nguyen
Attorney, Agent, or Firm—Harness, Dickey & Pierce

[57] ABSTRACT

A coupling having a coupling hub and a rotatably received coupling sleeve. Locking catches (19) are arranged between these two components to transmit torque. Supporting faces of the locking catches, in the torque transmitting position, are supported on corresponding supporting faces of the coupling hub and coupling sleeve. The locking catches are held in the torque transmitting position by switching rings which, via switching faces, act on corresponding switching faces at the ends of the locking catches. In the case of overloading, the switching ring is axially adjusted against the force of a spring and releases the coupling towards the disengaged position. The coupling slides inwardly as a result of the relative movement on the inclined supporting faces of the coupling sleeve.

7 Claims, 4 Drawing Sheets

COUPLING DISCONNECTED IN THE CASE OF OVERLOADING

The invention relates to a coupling having a coupling hub and a rotatably received coupling sleeve. Locking catches are arranged between the coupling hub and coupling sleeve. In a disengaged position, the catches engage recesses in the coupling hub. In a torque transmitting position, the catches are swivelled in such a way that at one end they are held on a supporting face of the hub recess and at the other end they are held in contact with an opposed supporting face of a sleeve recess.

A known coupling is illustrated in DE 35 28 591 C2. The coupling is used as a switchable catch freewheeling unit. Also, in addition to the freewheeling function, the possibility of disengagement exists. Such disengagement is achieved by external control means. Couplings having locking catches for torque transmitting purposes have proved to be successful because of their robust nature.

SUMMARY OF THE INVENTION

It is an object of the invention to provide a coupling which, while incorporating locking catches for torque transmitting purposes, disengages under overload conditions.

In accordance with the invention, the objective is achieved by a driving coupling hub, switching faces and circumferential locking catches. When viewed in the longitudinal section of the coupling, the switching faces extend along an incline which intersects the rotational axis of the coupling in the region of the axial extension of the locking catches. The switching faces are loaded by switching faces of laterally arranged switching rings all which extend in the same direction. At least one of the switching rings is spring-loaded in the axial direction towards the locking catches. The supporting faces of the locking catches and the supporting face of the coupling sleeve, if viewed in cross-section, are designed to correspond to each other and intersect a plane of a longitudinal section containing the rotational axis. Thus, when a predetermined torque value is exceeded, the locking catches are moved away from the supporting face of the coupling sleeve.

One advantage of the present invention is the locking catches prevent forces from being deflected, e.g. the locking catches permit a direct transmission of force between the coupling hub and the coupling sleeve. Because the locking catches swivel, friction losses are relatively low. A further advantage is that the switching effect is achieved as a result of axial pretensioning. Furthermore, by providing locking catches, it is possible to keep the interior of the coupling hub free from components which are important for the coupling function. Thus, for example, the hub may be slid over a driving journal. As a result, the overload coupling is relatively short.

In a further embodiment of the invention, the switching faces are each formed by two partial faces with different inclines. The angle of inclination of the first partial face of the locking catch positioned closest to the rotational axis is greater than, relative to the rotational axis, the second partial face which is positioned away from the rotational axis. Also, the angle of inclination of the first partial face of the switching rings, in respect of size, corresponds to the inclination of the second partial face of the locking catch and the second partial face of the switching rings, in respect of size, corresponds to the inclination of the first partial face of the locking catch.

The angle of inclination of the first partial face of the switching ring ranges between 20° and 60°. The advantage of this design is that in the first part of the switching path, full force is affective to keep the locking catches in the torque transmitting position. When the set torque value is exceeded, the locking catches are swivelled, with the second switching face of the locking catches coming into contact with the first switching face of the switching rings. As these extend at a greater angle of inclination than the first partial faces of the locking catches, the outwardly directed force is reduced and in consequence, the switching force necessary to hold the locking catches in the disconnected position is also reduced, with as little friction as possible. The required disengagement force is determined by the angular conditions of the switching faces and, in respect of magnitude, is such that it is sufficient, when the coupling hub and coupling sleeve are stationary relative to each other, to reconnect the coupling by swivelling the locking catches into the recesses of the coupling sleeve.

According to a further embodiment, the switching faces or partial faces associated with the switching rings are designed as externally conical faces. The cone axis of the faces is positioned on the rotational axis.

Further, according to an embodiment of the invention, to achieve the switching effect it is necessary for one of the two switching rings to be movably arranged. The other switching ring may be stationary. The movable switching ring is preferably associated with the coupling hub. It is also possible for both switching rings to be movable on the coupling hub.

To permit the coupling hub to be received on a journal, the movable switching ring should be guided on a projection of the coupling hub. Also, the ring should be loaded by a spring which, at the spring's other end, is supported on a supporting ring secured to the coupling hub.

If the coupling is to be used merely as an overload coupling, the locking catches and the recess in the coupling sleeve should be provided with stops. The stops prevent the coupling sleeve from rotating faster than the coupling hub. The stops extend in the direction opposite to that of the supporting face of the recess in the coupling sleeve. If stops are not provided, an overtaking function may also be provided.

Instead of the switching faces including two partial faces extending at different angles of inclination, it is also possible to select a curved design, e.g. there are no transition edges. The angles of inclination change along the extension of the faces.

From the following detailed description taken in conjunction with the accompanying drawings and subjoined claims, other objects and advantages of the present invention will become apparent to those skilled in the art.

BRIEF DESCRIPTION OF THE DRAWINGS

A preferred embodiment of the invention is diagrammatically illustrated in the drawing wherein.

DETAILED DESCRIPTION OF THE PREFERRED EMBODIMENTS

Figure 1:
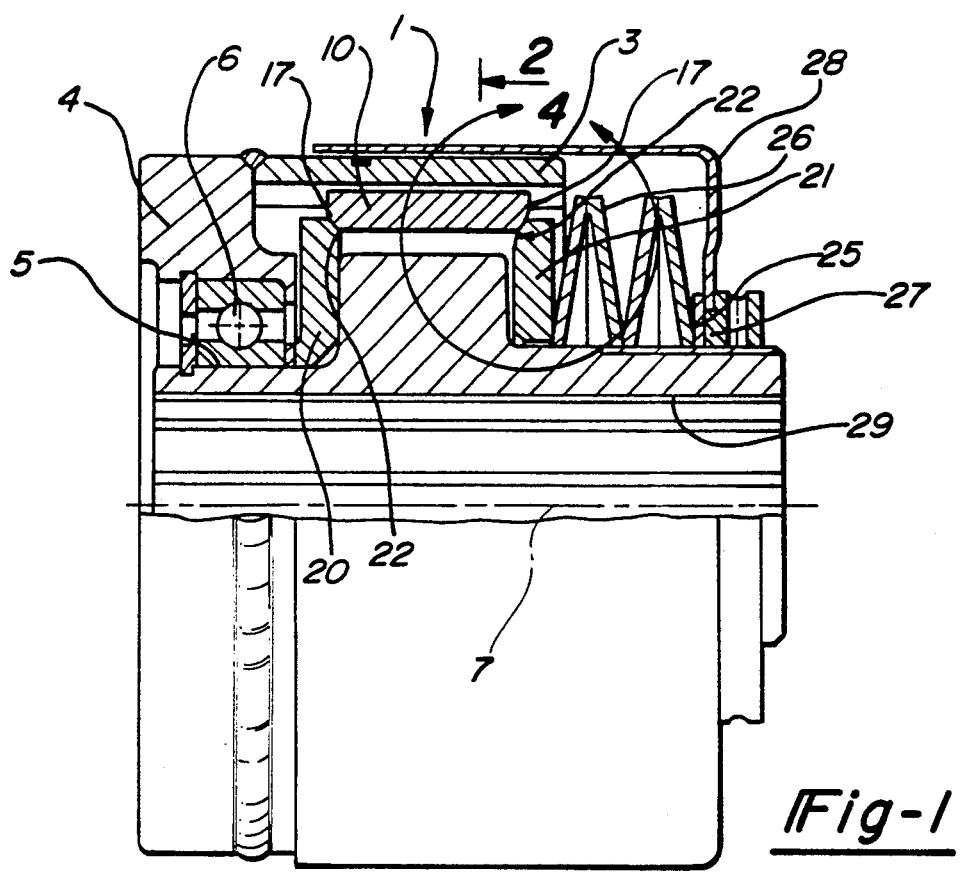
FIG. 1 is half a side elevation view partially in section of a connected coupling in accordance with the invention.

The coupling 1 illustrated in FIGS. 1 to 7 includes a coupling hub 2 rotatably receiving a coupling sleeve 3. The coupling sleeve 3 has a flange rotatably received on the coupling hub bearing seat 5 via a bearing 6. Both parts are rotatably arranged around the rotational axis 7.

Figure 2:
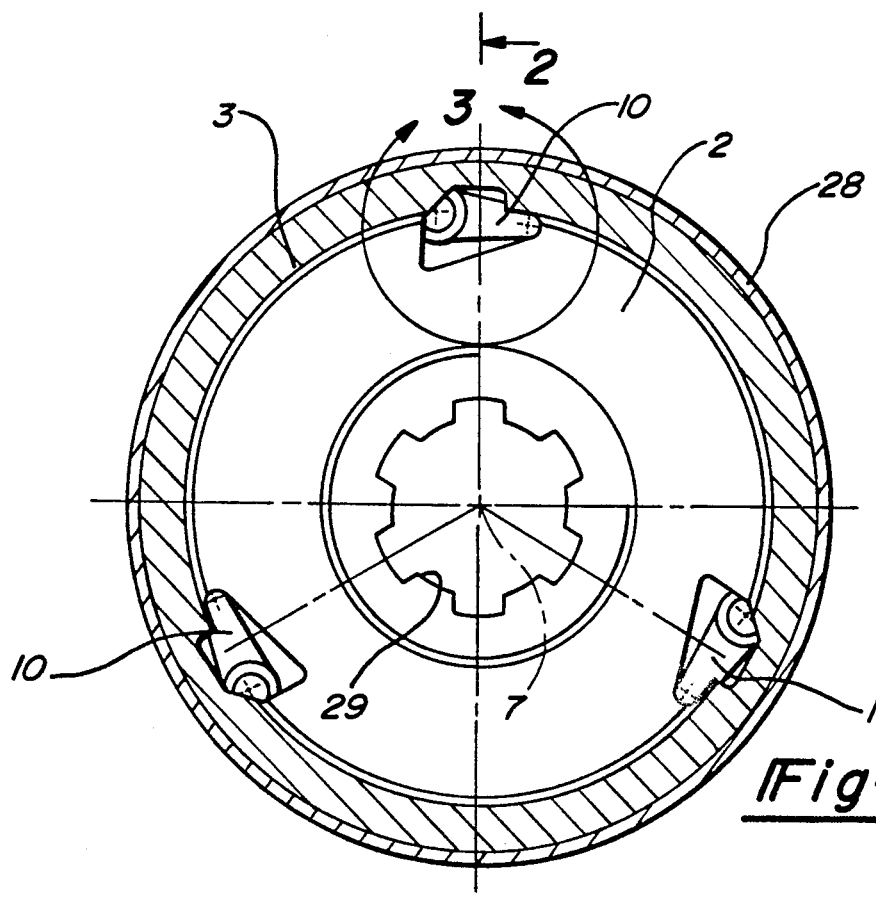
FIG. 2 is a section view of FIG. 1 along line 2—2 thereof.
Figure 3:
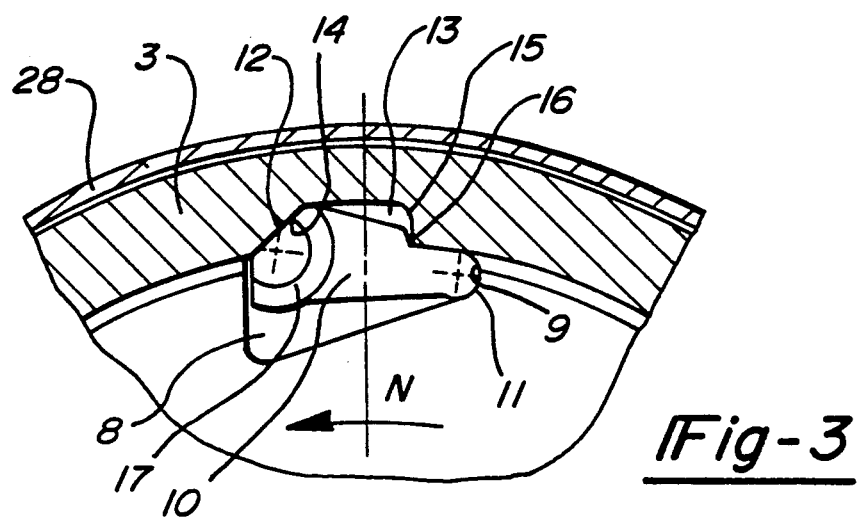
FIG. 3 is an enlarged view within circle Z of FIG. 2.

On its outer face, the coupling hub has recesses 8 which extend parallel to the rotational axis 7 and which have a supporting face 9 for a locking catch 10. As can be seen in FIG. 2, there are three such recesses 8 peripherally distributed around the circumference of the coupling hub 2. The supporting faces 9 constitute the rear face of the recess 8. The supporting faces extend in the direction of rotation as indicated by the arrow N as shown in FIG. 3.

The locking catches 10 are swivelably received in the recesses 8. The locking catch 10 has a first supporting face 11 which rests against the supporting face 9 of the coupling hub 2. The other end of the locking catch 10 has a second supporting face 12 which, in the torque transmitting position, rests against a correspondingly designed supporting face 14 of the coupling sleeve recess 13. The supporting face 14 extends along the coupling sleeve 3 parallel to the rotational axis 7, however, as can be seen in cross section in FIGS. 3 and 6, the face 14 is inclined. The incline intersects a plane of the longitudinal section, which plane extends into the drawing plane in FIG. 3, in such a way that, when a predetermined torque value is exceeded, the locking catches 10 engage the hub recesses 8 in such a way that they effect disengagement. Furthermore, the recesses 13 of the supporting face 14, on its opposite side, has a stop face 15. The stop face 15, in the torque transmitting position of the locking catches, contacts a corresponding stop face 16 of the locking catch 10.

Figure 4:
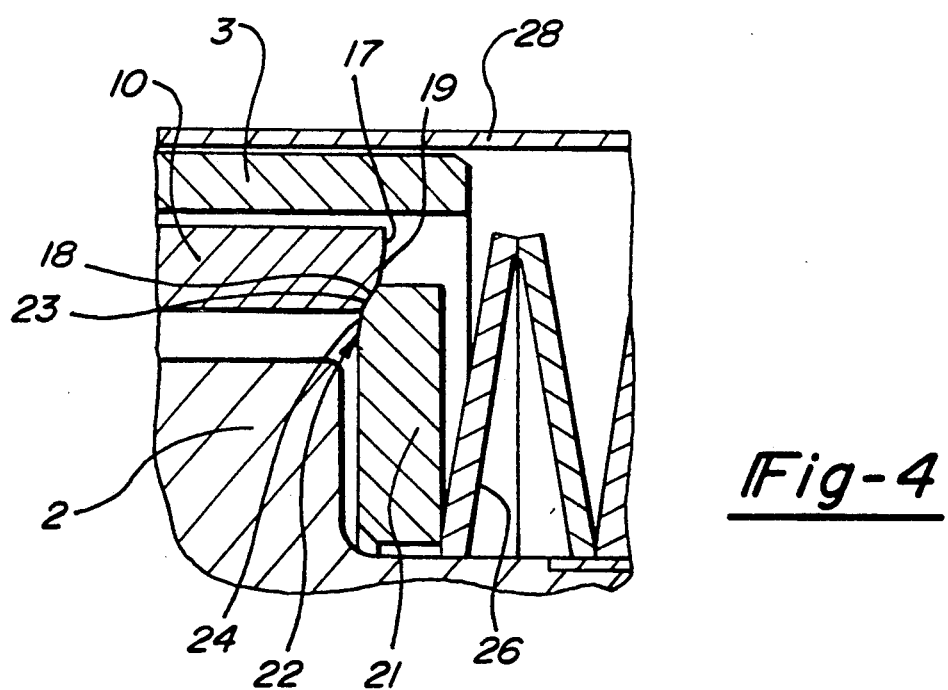
FIG. 4 is an enlarged view within circle Y of FIG. 1.
Figure 7:
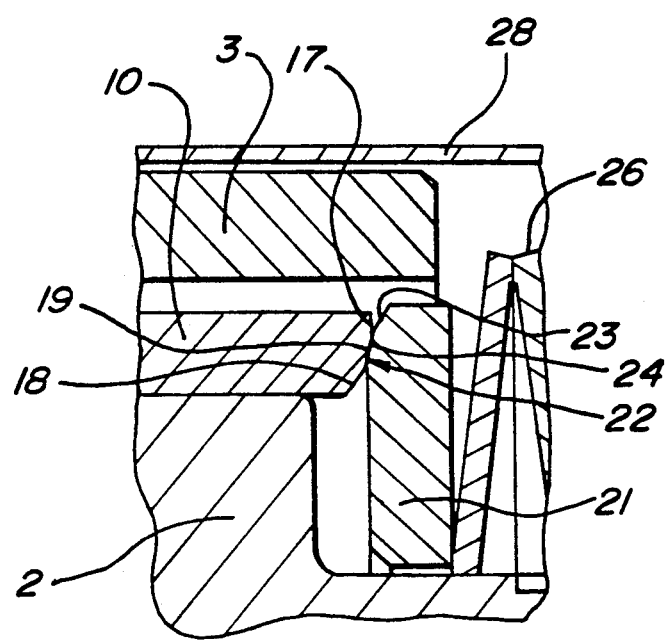
FIG. 7 is a view like FIG. 4 in the disconnected condition.

All of the locking catches 10 are loaded via switching rings 20, 21 in the direction of the torque transmitting position. The locking catches 10 and switching rings 20, 21 include switching faces 17 and 22, respectively, which rest against one another (see FIGS. 1 and 5). The faces 17 and 22 may have a curved design, with the tangents to the curve of the catches' switching face 17 intersecting the rotational axis of the coupling 1 at angles which decrease towards and with respect to the rotational axis 7. The switching faces 22 of the switching rings 20, 21 extend in the opposite direction. FIGS. 4 and 7 illustrate the switching faces 17 in an enlarged scale with respect to the way in which they are arranged and extend. The faces are not curved, but two partial faces 18, 19 and 23, 24, respectively, are provided at the locking catches 10 and switching rings 20, 21, respectively.

One of the switching rings, e.g. the switching ring 20, is arranged so as to be stationary. It is positioned axially between one end face of the coupling hub 2 and the bearing 6. Its switching face 22 loads the end face of the associated locking catch 10 which is positioned opposite and designed as a switching face 17. The other switching ring 21 is movable on a projection 25 of the coupling hub 2 and is supported against a spring 26.

The spring 26, in turn, is supported against a supporting ring 27. The ring 27 is stationarily secured on the hub projection 25. The supporting ring 27 has a threaded bore which is adjustably received on a corresponding thread of the projection 25 to permit pretensioning of the spring. The spring 26 is preferably designed as a disc spring. At its surface facing the locking catches 10, the switching ring 21 has a switching face 22 oppositely arranged, which rests against the switching face 17 of the locking catches 10.

Figure 5:
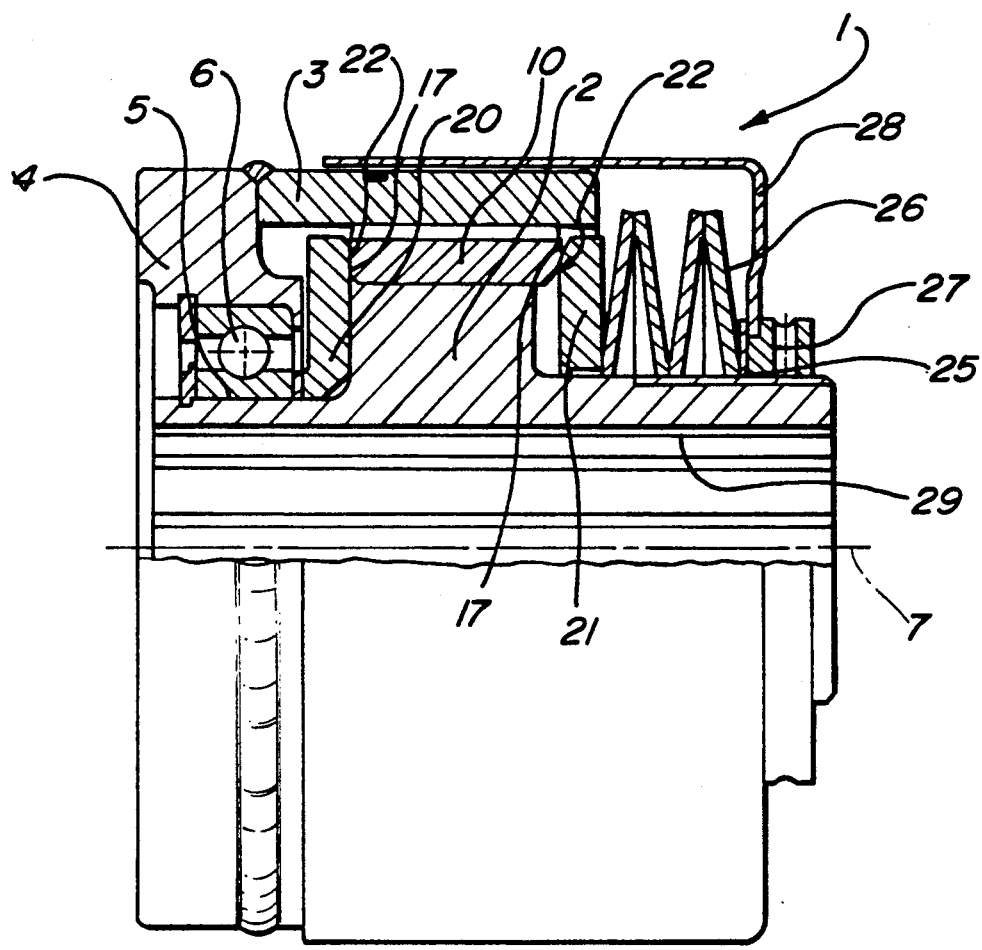
FIG. 5 is a view like FIG. 1, with the coupling in the disconnected condition.
Figure 6:
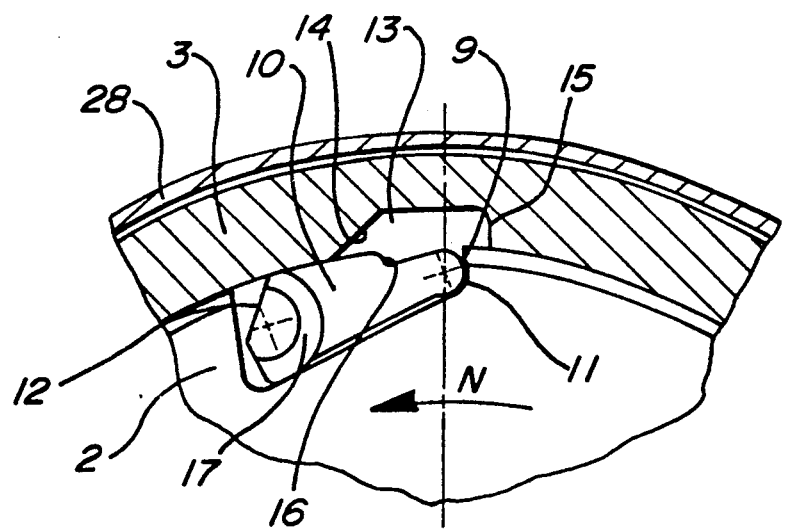
FIG. 6 is a view like FIG. 3 in the disconnected condition.

In the torque transmitting position, the first partial face 18 of the switching face 17 of the locking catch 10 rests against the second partial face 23 of the switching face 22 of the contacting switching rings 20, 21, of which only one is illustrated (see FIG. 4). The first partial face 18 of the switching face 17 of the locking catches 10 and the second partial face 23 of the switching face 22 of the switching rings 20, 21 extend at an angle of inclination which is smaller than that of the two partial faces 19, 24 of the locking catch 10 and the switching ring 21 respectively. This ensures that in the torque transmitting position, the force applied is sufficiently high to support the torque in cooperation with the size of the inclined supporting face 14 of the coupling sleeve 3. If this torque value is exceeded, a radial relative movement occurs between the two partial faces 18, 22 with the movable switching ring 21 being moved against the force of the spring 26 in the direction of the supporting ring 27. At the same time, the locking catches 10 swivel from the torque transmitting position around the swivel center determined by the supporting faces 11, 16, in the direction of the recess 8 into the disengaged position as illustrated in FIGS. 5 to 7. In the process, the two partial faces 19 and 24 of the locking catches 10 and switching rings 20, 21, respectively, which extend at a greater angle of inclination, contact one another. As a result of the swivel movement of the locking catches 10 relative to the coupling hub 2 and the switching rings 20, 21, the position of the point of contact between the switching faces 17 and 20 also changes, and the force is reduced which is to be applied to move the locking catches 10 via the supporting faces 14 and 12. The transfer into the disengaged position is facilitated because the lever arm is reduced between the contact points of the two switching faces 17, 22 relative to the supporting faces 9, 11. As, in addition, the inclination conditions become more favorable, e.g. a lower force is required for adjusting the switching ring 21, the locking catches 10 are accurately transferred into, and held in, the disengaged position. Only a small force remains for reengagement purposes.

The coupling hub 2 includes a bore 29 which is toothed and serves for to plug on to a driveshaft. The flange 4 of the coupling sleeve may be designed to secure to a shaft part to be driven or to a machine part. Furthermore, a cover 28 bridges the space between the coupling sleeve 3 and the coupling hub 2.

While the above detailed description describes the preferred embodiment of the present invention, the invention is susceptible to modification, variation, and alteration without deviating from the scope and fair meaning of the subjoined claims.

I claim:

1. A coupling comprising:

a coupling hub and a coupling sleeve rotatably received thereon;

a plurality of locking catches swivelably arranged between the coupling hub and coupling sleeve, said catches in a disengaged position engaging recesses in said coupling hub and, in a torque transmitting position, said catches being, at one end, held on a supporting face of the hub recess and at the other end being held in contact with an opposed supporting face of a recess of the coupling sleeve;

said coupling hub being a driving part, and said locking catches, at their sides, including first switching faces which, if viewed in longitudinal section, extend on an incline which intersects the rotational axis of the coupling in the region of axial extension of the locking catches, said catches' first switching faces being loaded by switching faces of laterally arranged switching rings, at least one of said switching rings being spring-loaded in the axial direction towards the locking catches and a second supporting face of the locking catches and a supporting face of the coupling sleeve, viewed in the cross-section, corresponding to each other and intersecting a plane of a longitudinal section containing the rotational axis in such a way that when a predetermined torque value is exceeded, the locking catches move away from the supporting face of the coupling sleeve.

2. A coupling according to claim 1, wherein said first catch switching faces and said ring switching faces are each formed by two partial faces with different inclines, an angle of inclination of the first partial face of the locking catch positioned closest to the rotational axis being smaller than, relative to the rotational axis, that of the second partial face positioned away from the rotational axis, and the angle of inclination of the first partial face of the switching rings, in respect of size, corresponding to that of the second partial face of the locking catch and that of the second partial face of the switching rings, in respect of size, corresponding to that of the first partial face of the locking catch.

3. A coupling according to claim 2, wherein the angle of inclination of the first partial face of the switching rings ranges between 20° and 60°.

4. A coupling according to claim 1, wherein the switching faces or partial faces of the switching rings are designed as externally conical faces, with a cone axis being positioned on the rotational axis.

5. A coupling according to claim 1, wherein one of the switching rings is stationarily held on the coupling hub and the other switching ring is movably held on the coupling hub.

6. A coupling according to claim 5, wherein said movable switching ring is guided on a projection of the coupling hub and loaded by a spring, said spring, at its other end, being supported on a supporting ring secured to the coupling hub.

7. A coupling according to claim 1, wherein said locking catches and sleeve recess include stops which prevent the coupling sleeve from rotating faster than the coupling hub and which extend in a direction opposite to that of the coupling sleeve recess supporting face.

* * * * *